May 12, 1964
A. D. DE LANO
3,132,423
FOOD CUTTING APPARATUS
Filed June 22, 1962
3 Sheets-Sheet 1
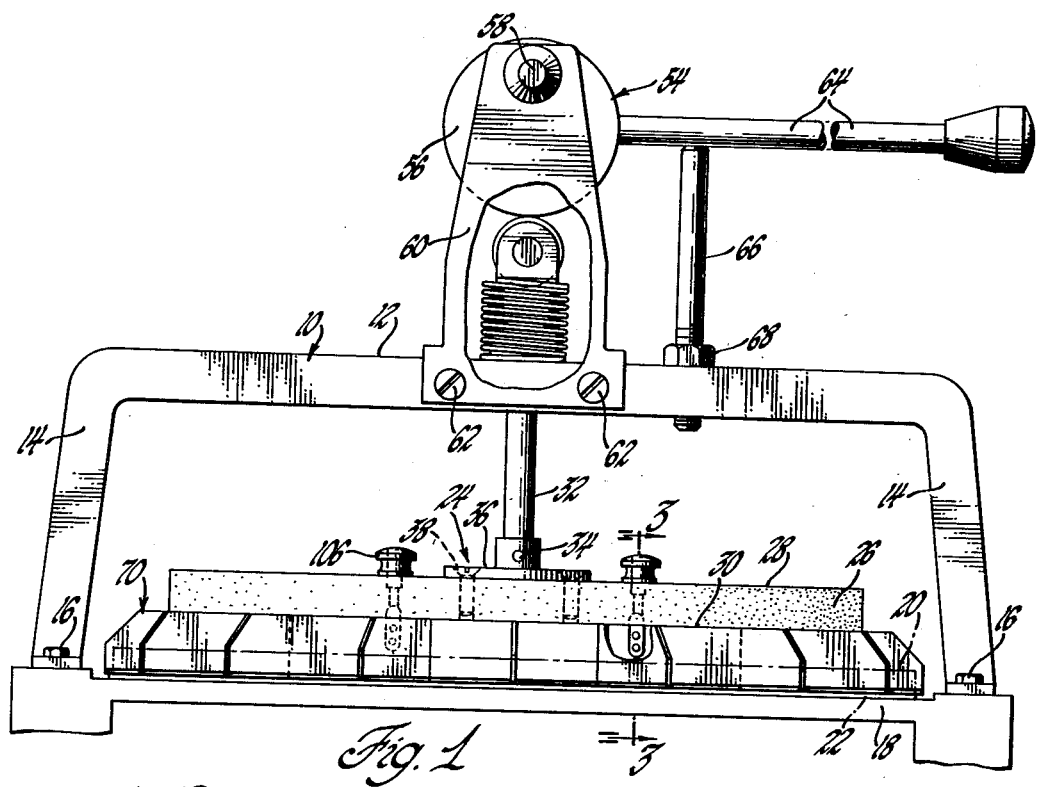
Fig. 1
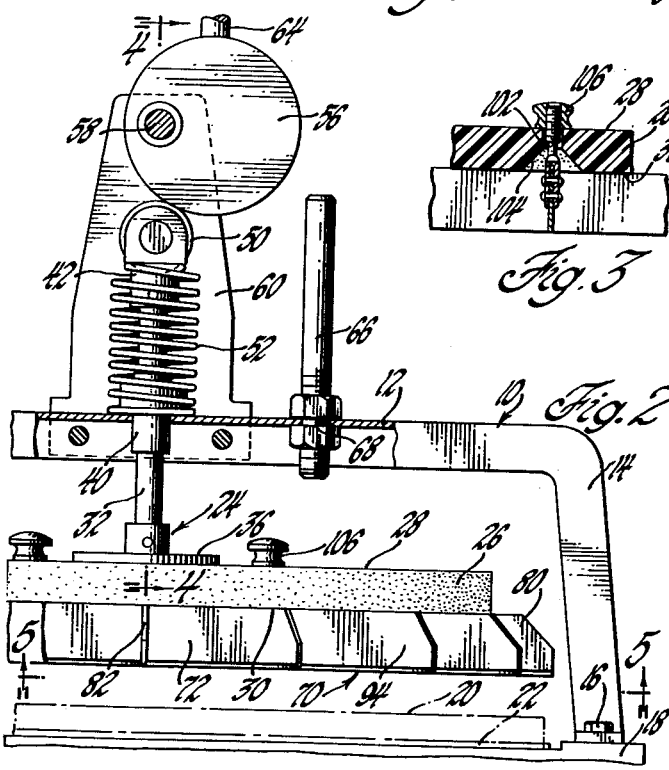
Fig. 2
Fig. 3
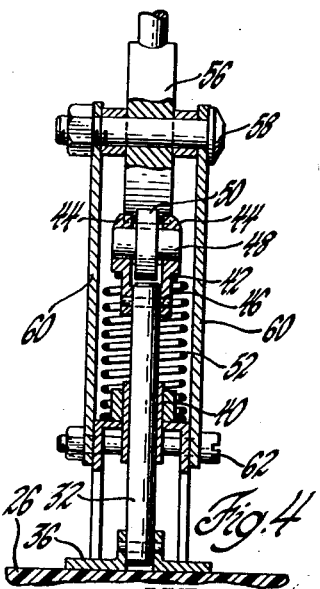
Fig. 4
INVENTOR.
Artus D. DeLano
BY Roy A. Plant
ATTORNEY May 12, 1964

A. D. DE LANO 3,132,423

FOOD CUTTING APPARATUS

Filed June 22, 1962

INVENTOR.
Arlus D. DeLano
BY Roy A. Plant
ATTORNEY

May 12, 1964

A. D. DE LANO 3,132,423

FOOD CUTTING APPARATUS

Filed June 22, 1962

INVENTOR.
Artus D. DeLano
BY Roy A. Plant
ATTORNEY

United States Patent Office 3,132,423
Patented May 12, 1964

3,132,423
FOOD CUTTING APPARATUS
Artus D. De Lano, 472 Capital Ave., NE.,
Battle Creek, Mich.
Filed June 22, 1962, Ser. No. 204,489
19 Claims. (Cl. 30—114)

This invention pertains to an apparatus for cutting foods and, in particular, to an apparatus for cutting hot food products of the type containing relatively viscous substances, such as pizza pies.

Various types of devices have heretofore been proposed for cutting at room temperatures various types of food products such as cheeses, dessert pies and pizza pies. However, in part because of their relative complexity and attendant expense and in part due to sanitary problems resulting from the difficulty of cleaning or washing them, such prior food cutting devices have not enjoyed much acceptance particularly in establishments engaged in a large volume of business of baking and selling fresh hot pizza pies. More specifically, and with particular reference to the cutting of freshly baked hot pizza pies at room temperatures, it will be appreciated that the viscuous cheese substances and other components of such pizza pies tend to cling to the blades of the food cutting device after the cutting operation. Suffice it to say that, due at least to sanitary considerations, it is advisable and necessary to clean such food cutting devices periodically. However, prior known apparatus of the type adaptable to the cutting of pizza pies in particular have been characterized by relatively rigid components making it rather difficult to easily clean such apparatus periodically. As a result, rather than using such prior cutting devices, it is the common practice at the present time to cut pizza pies by using shears or a sharp knife which is a relatively time and manpower consuming and expensive operation in establishments enjoying a large volume of pizza pie business.

In addition, and with particular reference to food cutting devices heretofore proposed for cutting hot, freshly baked pizza pies, it has of course been necessary to transfer the pie from the oven to the food cutting device. This handling operation normally involves retrieving the hot pie from the oven using the well known bakers spatula, and then transferring the pie to the food cutting device. However, in transferring the pie to the food cutting device, either no means at all has been provided for accurately locating the pie under the blades of the cutting device or, if provided, such means have been relatively complex adding to the cost of and difficulty of cleaning such equipment.

Furthermore, and again referring specifically to the cutting of pizza pies, it heretofore has been found expedient to bake pizza pies in different sizes and cut them diametrically to provide pieces of pie of varying size to suit the requirements of different individuals. Thus, where mechanical apparatus have been suggested for cutting pizza pies, they invariably result in individual pieces of the pie which vary in size only in accordance with the diameter of the pie itself being cut. In other words, given one particular size of pizza pie to be cut, such prior apparatus cut such pie into equal sized pieces, and two pies of different size must be cut to provide an assortment of pie pieces of varying sizes in accordance with the various taste and requirements of different individuals. It was a recognition of these and other problems in the food cutting art, and particularly with respect to the art of cutting pizza pies, which led to the conception and development of the present invention.

Therefore, the objects and features of the present invention include the provision of an improved apparatus for quickly and efficiently cutting food products, and particularly freshly baked hot pizza pies, while avoiding one or more of the problems discussed above as well as others.

It is yet another object and feature of this invention to provide an improved food cutting apparatus, particularly for cutting hot freshly baked pizza pies, which may be assembled and disassembled rapidly, efficiently and with a minimum of effort to facilitate washing or cleaning of the apparatus.

It is yet another object and feature of this invention to provide an apparatus of the character described comprising a cutting head and a blade head, the latter including a plurality of cutting blades, and means firmly securing together the cutting head and blade head including the blade components of the latter while using the apparatus in a food cutting operation, while being readily detachable to quickly and readily disassemble the cutting head, blade head and the blade components of the latter for washing or cleaning purposes.

It is yet another object and feature of this invention to provide an apparatus of the type aforedescribed further comprising cooperable means carried by the cutting head and blade head to facilitate reassembly thereof after a washing or cleaning operation.

It is yet another object and feature of this invention to provide an apparatus of the character described comprising a blade head operable to cut a single pizza pie of a given size into pieces of at least two different sizes and shapes.

It is yet another object and feature of this invention to provide a food cutting apparatus including a blade head having a plurality of centrally mating or intersecting cutting blades radially disposed relative to each other, and in which the cutting edges of certain of such cutting blades terminate at points radially spaced from the point of intersection or mating thereof, thereby reducing the tendency of the blade head to clog at such point of intersection or mating upon cutting a hot, freshly baked pizza pie or the like.

It is yet another object and feature of this invention to provide a food cutting apparatus particularly for cutting hot, freshly baked circular pizza pies, comprising a cutting board including a pair of locating pins spaced thereon, a blade head including a plurality of cutting blades mounted for reciprocation over the aforementioned cutting board for cutting engagement and disengagement with a pie mounted thereon, a spatula-type platter means including means thereon for locating a circular pizza pie substantially centrally thereof and including an arcuate peripheral portion engageable with the aforementioned locating pins to, in turn, substantially center the spatula-type platter means beneath the blade head.

Still further objects, features and advantages of the invention will appear hereinafter as the description of the invention proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

FIGURE 1 is a side elevation, partly broken away to illustrate certain details, of an apparatus particularly adapted for cutting hot freshly baked pizza pies and illustrating a preferred embodiment of the invention, the apparatus being shown in a pie-cutting position;

FIGURE 2 is a fragmentary view corresponding generally to FIGURE 1, but illustrating the apparatus in its non-cutting position out of engagement with the pie to be cut, certain parts of the drawing being broken away and in section to illustrate certain details of the invention;

FIGURE 3 is a fragmentary sectional view taken on line 3—3 of FIGURE 1;

FIGURE 4 is a fragmentary sectional view taken on line 4—4 of FIGURE 2;

Figure 5:
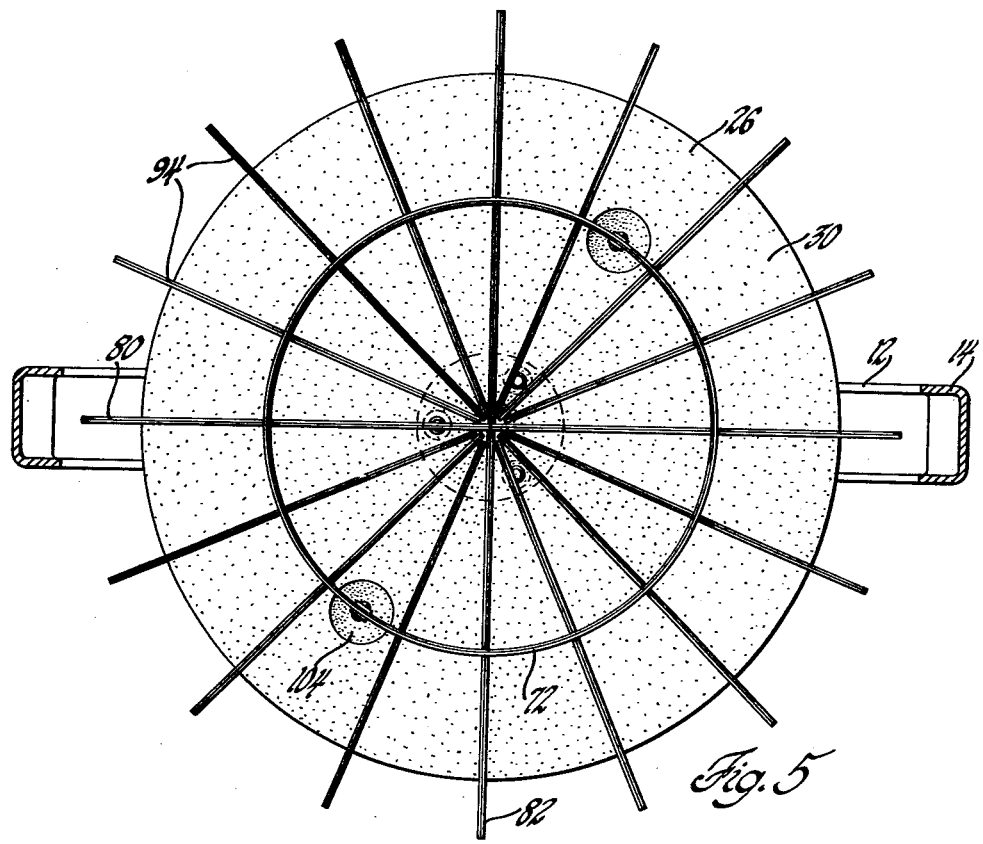
FIGURE 5 is a view of the apparatus taken on line 5—5 of FIGURE 2.

Referring now to FIGURES 1 through 6 of the drawings, there is illustrated a food cutting apparatus particularly designed for use in cutting at room temperature hot freshly baked pizza pies, and comprising an arched or generally U-shaped support means or frame 10 including a central base portion 12 having integral support legs 14 at opposite ends thereof adapted to be suitably secured, as by the fasteners illustrated at 16, to a suitable surface such as a cutting board illustrated at 18. A pizza pie to be cut is illustrated in dotted lines at 20 in FIGURES 1 and 2 as resting on a suitable platter 22, usually of cardboard or the like, which in turn rests on the cutting board 18 in position for engagement of the pizza pie with the cutting instrumentalities to be described hereinafter.

A cutting head 24 comprises a disc 26 of circular configuration as illustrated particularly in FIGURE 5, and includes oppositely spaced substantially flat or plane parallel surface portions 28 and 30, respectively. Preferably, the disc or the exposed surfaces thereof including the surface portions 28 and 30 are provided with or formed of an easily washable material such as Formica. A cylindrical spindle 32 has one end suitably secured as by the pin 34 to a bracket 36 secured as by the fasteners 38 to the surface portion 28 of the disc 26, and is disposed for vertical reciprocation within a bushing 40 suitably secured substantially centrally of the base portion 12 of the support means or frame 10. A bifurcated head member 42 including the spaced legs 44 is suitably secured to the other end of the spindle 32 as by the pin 46 and pivotally mounts on the pin 48 a cam follower roller 50. A coiled spring 52 extends between the base portion 12 of the support means or frame and the head member 42 to continuously bias the spindle 32 vertically upwardly within the bushing 40 and relative to the support means or frame 10 to continuously urge the cutting head 24 to the position illustrated in FIGURE 2 out of engagement with the pizza pie located on the cutting board 18.

Vertical drive means 54 are provided for vertically reciprocating the spindle 32 and hence the cutting head 24 downwardly to the cutting position illustrated in FIGURE 1 against the influence of the spring 52. The vertical drive means 54 comprises a circular drive cam 56 having a portion thereof spaced from its center suitably pivotally connected as by the pivot bolt 58 to one end of a pair of upstanding spaced support brackets 60 having their other ends suitably secured as by the fasteners 62 to the base portion of the support means or frame 10. A handle 64 is suitably secured to the drive cam 56 and extends therefrom, and is adapted to be grasped manually to pivot the drive cam from the position illustrated in FIGURE 2 to that illustrated in FIGURE 1 to vertically reciprocate the cutting head 24 into a cutting position relative to the pizza pie. A stop rod 66 is adjustably vertically mounted on support means or frame 10 as by means of the threaded connection 68, and is in alignment with the plane of pivotal movement of the handle 64 so as to engage the latter as illustrated in FIGURE 1 to limit downward or feeding movement of the cutting head into a cutting position relative to the pizza pie.

The blade head indicated generally at 70 is carried by the cutting head 24, and comprises a continuous circular base cutting blade 72 having a diameter substantially less than that of the circular disc 26 of the cutting head 24. One edge 74 of the base cutting blade is substantially flat and includes a plurality of circumferentially spaced notches 76 in accordance with the number of cutting blades to be mounted thereon, while the other edge thereof is beveled or otherwise formed into a sharp cutting edge 78. A pair of first or stabilizing blade members 80 and 82, respectively, each include a substantially flat edge 84 and an edge which is beveled or otherwise formed into a relatively sharp cutting edge 86. A notch 88 is formed substantially centrally of the one stabilizing blade member 80 so as to communicate with the flat edge thereof while, in similar fashion, a notch 90 is formed substantially centrally of the other stabilizing blade member 82 so as to communicate with its cutting edge 86. Additionally, each of the stabilizing blade members includes notches 92 spaced on either side of the notches 88 and 90, respectively, in communication with the respective cutting edges 86 of the stabilizing blade members for interfitting engagement with opposite pairs of notches 76 in the base cutting blade 72.

Figure 6:
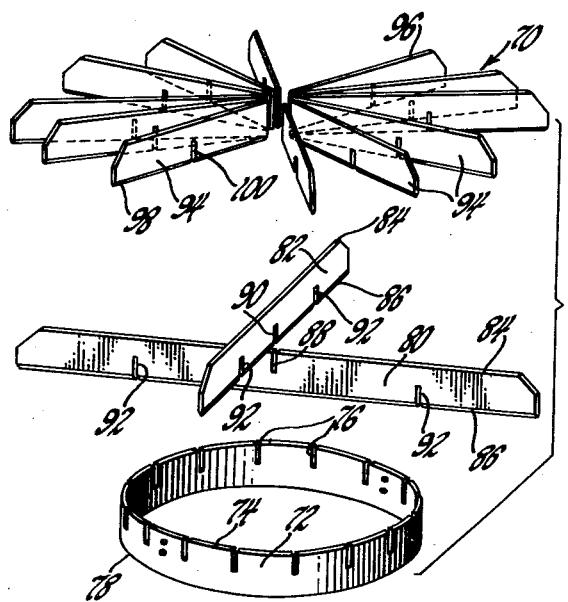
FIGURE 6 is an exploded perspective view of the blade head of the apparatus.

As will be apparent particularly from FIGURES 5 and 6 of the drawings, the notches 88 and 90 of the respective stabilizing blade members 80 and 82 are adapted to be detachably engaged in interfitting relationship to dispose the stabilizing blade members at right angles to each other, and the other notches 92 in the respective stabilizing blade members similarly engage corresponding pairs of diametrically opposite notches 76 in the base cutting blade 72. As a result, the stabilizing blade members extend diametrically of the base cutting blade, intersect the latter and extend radially beyond the periphery of disc 26. Furthermore, the point of intersection of the stabilizing blades at the notches 88 and 90 is located substantially centrally of disc 26 and base cutting blade 72. Finally, it should be readily apparent that the depths of the respective interfitting notches aforedescribed are such as to dispose the flat edges and cutting edges of the base cutting blade and stabilizing blade members in substantially parallel spaced planes.

In similar fashion, a plurality of second cutting blade members 94 each include a flat edge 96 and an opposite cutting edge 98 beveled or otherwise formed and communicating with the notches 100 carried respectively thereby. As illustrated particularly in FIGURES 5 and 6, a desired number of these second cutting blade members, herein shown to be three in number, are adapted to be angularly spaced within each quadrant formed by the first or stabilizing blade members 80 and 82 with one end of each thereof nested at the point of intersection of the first or stabilizing blade members and extending radially therefrom with its notch 100 detachably interfitting a corresponding notch 76 in the base cutting blade 72 and extending radially beyond the periphery of the disc 26 to a distance substantially equal to that of the first or stabilizing blade members 80 and 82. As will be apparent, the notches carried respectively by the second cutting blade members 94 and the corresponding interfitting notches of the base cutting blade 72 are cut to a depth to dispose the flat edges of the second cutting blade members and the cutting edges thereof in the substantially parallel planes of the corresponding edges of the stabilizing blade members and base cutting blade as aforementioned.

In order to readily assemble and disassemble the blade head 70 relative to the cutting head 24, there are provided a pair of support rods 102, each having one end suitably fixedly secured in diametrically opposite portions of the base cutting blade 72. Each of these rods extends through a corresponding passage in disc 26 including a tapered conical recess 104 communicating with the plane surface portion 30 of the disc. The other end of each of these rods are threaded to receive the nuts 106. Thus, with the blade head assembled to the cutting head and referring particularly to FIGURE 2, it will be seen that the substantially flat edges of the various cutting blade members aforementioned are held substantially flush against the plane surface portion 30 of the disc 26. The tapered conical recesses facilitate assembly of the blade head 70 on the disc 26 of the cutting head. Thus, particularly where the blade head is assembled on the cutting head by sliding the former beneath the latter and then lifting upwardly to insert the support rods 102 into the corresponding passages through the disc 26, the tapered conical recesses 104 thereof will receive and guide the support rods through the disc if initially misaligned somewhat with their passages, as will be readily apparent.

In operation, it will be appreciated that a pizza pie 20 may be placed on the cutting board 18 with the apparatus in the FIGURE 2 position, and the handle 64 and drive cam 56 manually rotated in the FIGURE 1 position to vertically drive the blade head into cutting engagement with the pizza pie as limited by stop rod 66. Thereafter, upon release of the handle 64, the spring 52 will return the apparatus to the position illustrated in FIGURE 2. When it is desired to clean or wash the apparatus, the nuts 106 are loosened and the entire blade head 70 removed from the cutting head and the respective blade members of the blade head detached from each other merely by slipping them out of interfitting engagement with the corresponding notches of the other blade members. Thereafter, the respective blade members may be easily washed. At the same time, the disc 26 and particularly the plane surface portion 30 thereof may be easily cleaned.

After the washing operation, it should be readily apparent from the foregoing description that the blade head may be readily reassembled by again interfitting the various notches carried by the various blade members as aforedescribed and as illustrated in FIGURE 6, inserting the support rods 102 through the disc 26 and drawing the nuts 106 tight, thereby disposing the flat edges of the respective blade members in firm abutting engagement with the plane surface portion 30 of the disc 26 to hold the entire blade head relatively rigid during subsequent and repeated pie cutting operations.

Finally, and referring particularly to FIGURE 5, it will be noted that the aforedescribed apparatus will cut a single pizza pie into two annular series of pieces; that is, the series contained radially inwardly and outwardly, respectively, of the base cutting blade 72, and that the pieces of any one such series will be substantially identical to each other. However, the pieces of each series will differ from each other in size and shape, thereby providing an assortment of pie pieces to fit the individual tastes and requirements of different individuals.

Figure 7:
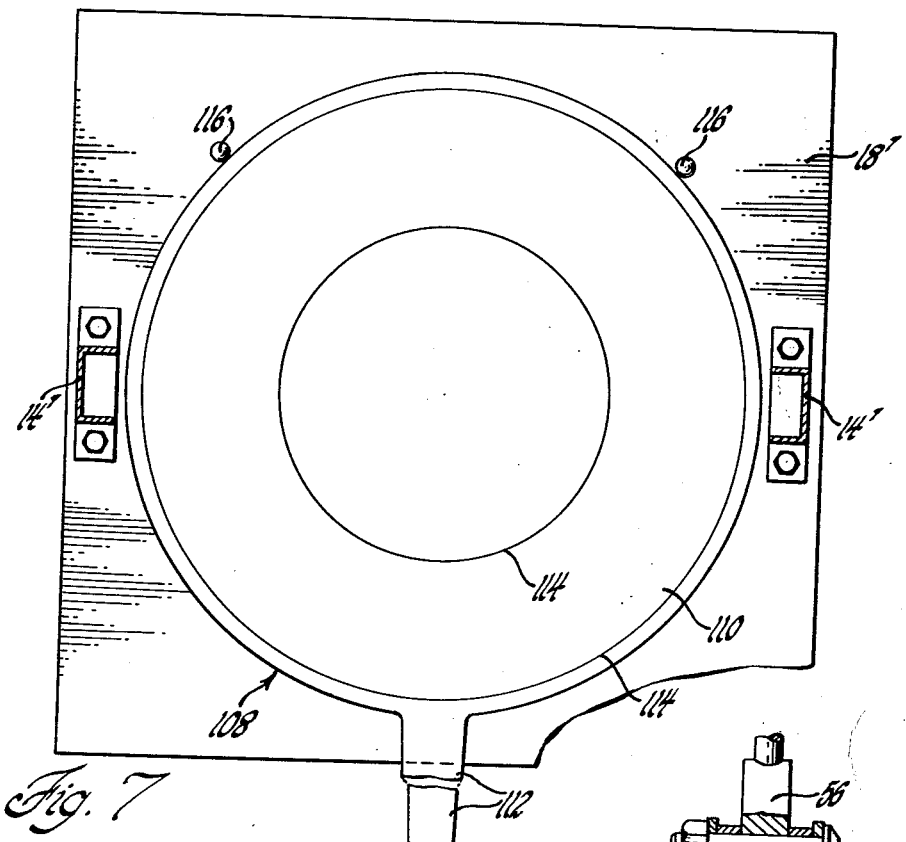
FIGURE 7 is a sectional view taken generally along the line 5—5 in FIGURE 2 but in a direction opposite to that of the arrows, and illustrates a modified form of cutting board usable with the cutting apparatus of FIGURES 1 through 6 in combination with a spatula-type platter means for a pie to be cut.

Referring now to FIGURE 7, there is illustrated a modified form of cutting board 18' adapted to be connected to the support legs 14' of the support means or frame 10 as previously described, and differing from the cutting board 18 primarily in including means cooperable with the spatula-type platter indicated generally at 108 to accurately orient or center the latter and a pizza pie contained thereon beneath the reciprocable cutting and blade heads previously described.

More specifically, the spatula-type platter 108 is of the well known type used by bakers and including a substantially circular head portion 110 and handle 112 projecting therefrom. However, in this instance, the head portion of the platter includes one or more locating rings 114, as desired or required, concentric with the center thereof. These locating rings may be formed by grooving the head portion of the spatula-type platter or otherwise, and the number and diameter thereof is determined by the sizes and ranges thereof of pies to be cut. Thus, the spatula-type platter may be used to remove a hot, freshly baked pizza pie from an oven and, depending upon the size of the pie, the latter centered on the center of the head portion of the spatula-type platter by arranging the periphery of the pie within the confines of a locating ring 114 of corresponding size.

Thereafter, the head portion 110 of the spatula-type platter is inserted on the cutting board 18' beneath the cutting and blade heads, and an arcuate peripheral portion thereof is adapted to abuttingly engage a pair of spaced locating pins 116 secured to the cutting board. The locating pins 116 are so spaced on the cutting board relative to the center of the cutting and blade heads and the diameter of the head portion of the spatula-type platter whereby the center of the head portion of the latter, upon abutment with both of the locating pins 116, in automatically centered with the center of the cutting apparatus or spindle 32 irrespective of the angle at which the handle 112 of the spatula-type platter may project from the cutting board. Therefore, the pie to be cut which is centered on the head portion of the spatula-type platter as previously described is automatically centered with respect to the cutting apparatus.

Figure 8:
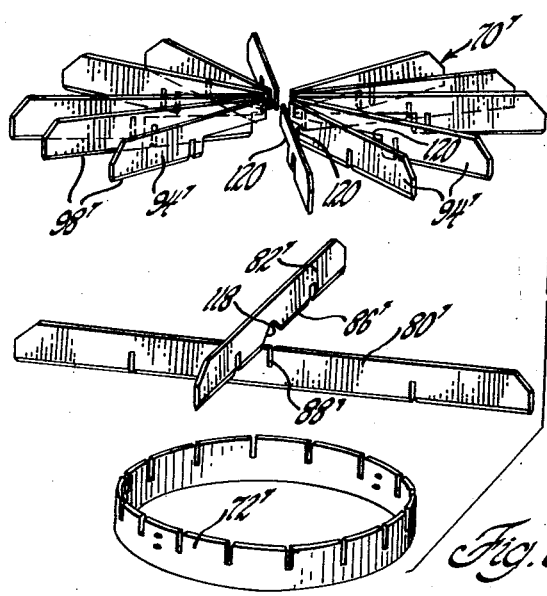
FIGURE 8 is an exploded perspective view corresponding generally to FIGURE 6, but illustrating a modified form of blade head for the apparatus of FIGURES 1 through 5.

Referring now to FIGURE 8 there is illustrated a modified form of blade head 70' which, with exceptions to be noted, is substantially identical to the blade head 70 previously described. More specifically, the blade head 70' comprises a base cutting blade 72', the first or stabilizing blade members 80' and 82' and second cutting blade members 94'. The base cutting blade 72' and respective blade members 80', 82' and 94' are notched for interfitting connection as previously described, and the blade head 70' is removably mountable on the disc 26 of cutting head 24 also as previously described. However, the blade head of this embodiment differs from that previously described in that the first or stabilizing blade member 82' includes a relieved portion or relatively wide notch 118 centrally of its cutting edge 86' for interfitting engagement with the notch 88' in the other stabilizing blade member 80'. In addition, the second cutting blade members 94' each include notched or relieved portions 120 between the base cutting blade 72' and their radially inner ends adjacent the joint of intersection of the first or stabilizing blade members 80' and 82'. In other words, the respective cutting edges 98' of the second cutting blade members 94' terminate radially inwardly of the base cutting blade 72' at points radially outwardly spaced from the point of intersection of the first or stabilizing blade members. It will also be noted that the notched or relieved portions 120 formed in the respective second cutting blade members 94' in a given quadrant of the blade head 70' alternately vary in length to correspondingly vary the lengths of the cutting edges 98'. Thus, the central portion of the blade head 70' engageable with the central portion of a hot, freshly baked pie to be cut includes alternately relieved portions throughout its circumferential extent, thereby reducing the tendency of the viscuous substances of the pie from clogging the central portion of the blade head, at least one blade of each adjacent pair thereof being sufficiently long to sever a pie segment for easy removal from the pie.

Figure 9:
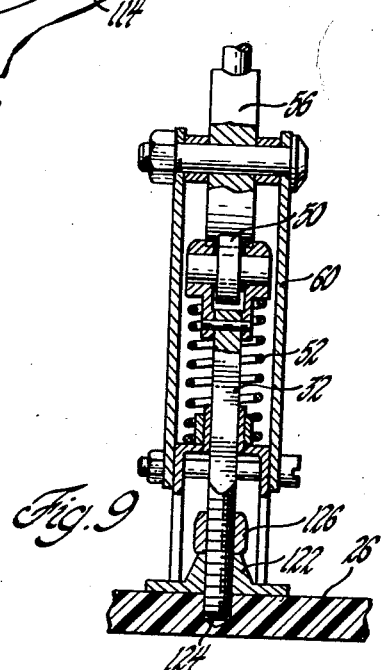
FIGURE 9 is a fragmentary sectional view corresponding generally to FIGURE 4 but illustrating a modified form of the connection illustrated in FIGURE 4.

Referring now to FIGURE 9, there is illustrated a modified form of connection between the spindle 32 and disc 26 of the cutting head as shown in FIGURE 4 and previously described. Since the construction illustrated in FIGURE 9 is, to a major extent, substantially identical to that shown in FIGURE 4, identical numerals are employed in FIGURE 9 to illustrate parts substantially identical to those previously described and shown in FIGURE 4.

More specifically, the primary difference between the constructions illustrated in FIGURES 4 and 9 is that, in the latter, the spindle 32 is connected to the disc 26 of the cutting head by a connection permitting adjustment of the cutting head along the spindle. Thus, as shown in FIGURE 9, the spindle 32 is threaded at its lower end for adjustable threaded engagement with a bracket 122 suitably secured to upper plane surface portion of the disc 26, and extends into a suitable bore or recess 124 in the latter. A locking nut 126 is also threadably engaged with the spindle whereby, upon backing the locking nut away from the bracket 122, the disc 26 may be threaded along the spindle to adjust their relative positions, the locking nut 126 then being threadable against the bracket as illustrated in FIGURE 9 to lock the disc relative to the spindle. Such an adjustable connection facilitates positioning of the cutting head 24 which, in cooperation with the adjustability of the stop rod 66 previously described and illustrated in FIGURES 1 and 2, readily permits accurate location of the cutting head 24 in a proper position for cutting a pizza pie on the cutting board 18 of FIGURE 1, and preventing overtravel of the cutting head into such pie.

While several forms of the invention have been shown and described, other forms will now be apparent to those skilled in the art. Therefore, it will be understood that the embodiments shown in the drawings and described above are merely for illustrative purposes, and are not intended to limit the spirit and scope of the invention.

Other modes of applying the principle of my invention may be employed instead of those explained, change being made as regards the article and combinations herein disclosed, provided the means stated by any of the following claims or the equivalent of such stated means be employed.

I therefore particularly point out and distinctly claim as my invention:

1. Food cutting apparatus comprising support means, a blade head including a continuous base cutting blade, a multiplicity of cutting blades intersecting said base cutting blade with at least part of same extending completely across and intersecting opposite spaced portions of said base cutting blade while others extend only from the center of said base cutting blade and across same, a carrying means for all of said cutting blades, means fastening said cutting blades on said carrying means portion of said blade head, the cooperating edges of said base cutting blade and said long and short intersecting cutting blades including notched interfitting portions to detachably support said base cutting blade and said long and short intersecting cutting blades relative to each other on said carrying means, and means mounting said blade head on said support means for reciprocable movement relative thereto.

2. Food cutting apparatus comprising support means, a blade head including a continuous base cutting blade, a multiplicity of intersecting cutting blades extending between and intersecting opposite spaced portions of said base cutting blade, cooperating edges of said base cutting blade and said intersecting cutting blades including notched interfitting portions to detachably support said base cutting blade and said intersecting cutting blades relative to each other, and means mounting said blade head on said support means for reciprocable movement relative thereto, said means mounting said blade head on said support means for reciprocable movement relative thereto comprises a spindle having one end thereof operatively secured to said blade head and being reciprocably slidably mounted on said support means, a cam follower roller pivotally mounted on the other end of said spindle, spring means surrounding said spindle and extending between said support means and said other end of said spindle to continuously urge said blade head to a non-cutting position relative to said support means, and further comprising manually operable means for reciprocating said blade head relative to said support means to a cutting position and including a drive cam pivotally mounted on said support means and engageable with said cam follower roller to reciprocate said blade head to said cutting position in opposition to said spring means, and stop means mounted on said support means and engageable with said manually operable means to limit reciprocation of said blade head to said cutting position.

3. The invention as defined in claim 2 in which said stop means is adjustably mounted on said support means.

4. Food cutting apparatus comprising support means, a blade head including a circular base cutting blade, a multiplicity of angularly spaced cutting blades with some extending radially out from the center of said circular base cutting blade and intersecting same, while others are substantially twice as long and extend diametrically of and intersect said base cutting blade twice while intersecting each other substantially centrally of said base cutting blade, a carrying means for all of said cutting blades, means removably fastening all of said cutting blades on said carrying means portion of said blade head, the cooperating edges of said base cutting blade and said angularly spaced long and short cutting blades including notched interfitting portions to detachably interengage said angularly spaced cutting blades and said base cutting blade, and means mounting said blade head on said support means for reciprocable movement relative thereto.

5. Food cutting apparatus comprising support means, a blade head including a circular base cutting blade, a plurality of first angularly spaced cutting blades extending diametrically of and intersecting said base cutting blade and therebeyond and intersecting each other substantially centrally of said base cutting blade, a plurality of second cutting blades angularly spaced between said first cutting blades and extending from the intersection thereof radially of and intersecting said base cutting blade and therebeyond, cooperating intersecting edges of said base cutting blade and said first and second cutting blades including notched interfitting portions to detachably support said first and second cutting blades on said base cutting blade, and means mounting said blade head on said support means for reciprocable movement relative thereto.

6. Food cutting apparatus comprising support means, a cutting head including a substantially plane surface portion thereof, means mounting said cutting head on said support means for reciprocable movement relative thereto, a blade head including a continuous base cutting blade, a plurality of intersecting cutting blades extending between and intersecting opposite spaced portions of said base cutting blade, cooperating edges of said base cutting blade and said intersecting cutting blades including notched interfitting portions to detachably support said intersecting cutting blades on said base cutting blade, and means detachably supporting said blade head on said cutting head with said base cutting blade and said intersecting cutting blades abutting said plane surface portion of said cutting head to detachably hold the notched portions of said cutting blades in interfitting engagement.

7. The invention as defined in claim 6 in which said means mounting said cutting head on said support means for reciprocable movement relative thereto comprises a spindle having one end thereof secured to said cutting head and reciprocably slidably mounted on said support means, a cam follower roller pivotally mounted on the other end of said spindle, spring means surrounding said spindle and extending between said support means and said other end of said spindle to continuously urge said cutting head to a non-cutting position relative to said support means, and further comprising manually operable means for reciprocating said cutting head relative to said support means to a cutting position and including a drive cam pivotally mounted on said support means and engageable with said cam follower roller to reciprocate said cutting head to said cutting position in opposition to said spring means.

8. The invention as defined in claim 7 further comprising stop means adjustably mounted on said support means and engageable with said manually operable means to limit reciprocation of said cutting head to said cutting position.

9. The invention as defined in claim 6 in which said means detachably supporting said blade head on said cutting head comprises a plurality of spaced support rods secured to said blade head and extending through said cutting head, and a plurality of spaced passages through said cutting head and each including a tapered conical recess communicating with said plane surface portion thereof to receive and guide respective ones of said support rods.

10. The invention as defined in claim 9 in which said support rods are secured to said base cutting blade of said blade head.

11. Food cutting apparatus comprising support means, a cutting head including a substantially plane surface portion thereof, means mounting said cutting head on said support means for reciprocable movement relative thereto, a blade head including a circular base cutting blade, a plurality of first angularly spaced cutting blades extending diametrically of and intersecting said base cutting blade and therebeyond and intersecting each other substantially centrally of said base cutting blade, a plurality of second cutting blades angularly spaced between said first cutting blades and extending from the intersection thereof radially of and intersecting said base cutting blade and therebeyond, cooperating intersecting edges of said base cutting blade and said first and second cutting blades including notched interfitting portions to detachably support said first and second cutting blades on said base cutting blade, and means detachably supporting said blade head on said cutting head with said base cutting blade and said first and second cutting blades abutting said plane surface portion of said cutting head to detachably hold the notched portions of said cutting blades in interfitting engagement.

12. The invention as defined in claim 11 in which said means mounting said cutting head on said support means for reciprocable movement relative thereto comprises a spindle having one end thereof secured to said cutting head and reciprocably slidably mounted on said support means, a cam follower roller pivotally mounted on the other end of said spindle, spring means surrounding said spindle and extending between said support means and said other end of said spindle to continuously urge said cutting head to a non-cutting position relative to said support means, and further comprising manually operable means for reciprocating said cutting head relative to said support means to a cutting position and including a drive cam pivotally mounted on said support means and engageable with said cam follower roller to reciprocate said cutting head to said cutting position in opposition to said spring means, and an operating handle secured to said drive cam for pivoting the latter.

13. The invention as defined in claim 12 further comprising a stop pin adjustably mounted on said support means in the path of pivotal movement of said handle and engageable therewith to limit reciprocation of said cutting head to said cutting position.

14. The invention as defined in claim 11 in which said means detachably supporting said blade head on said cutting head comprises a plurality of spaced support rods secured to said base cutting blade and extending through said cutting head, and a plurality of spaced passages through said cutting head and each including a tapered conical recess communicating with said plane surface portion thereof to receive and guide respective ones of said support rods.

15. The foot cutting apparatus as defined in claim 1 further comprising a cutting board secured to said support means beneath said blade head, and a pair of locating pins on said cutting board for engagement with platter means for an article of food to be cut upon insertion of such platter means on said cutting board beneath said blade head, said pins being in predetermined spaced relationship relative to said blade head and such platter means to substantially center the latter beneath said blade head.

16. The food cutting apparatus as defined in claim 2 in which said one end of said spindle is secured to said blade head by an adjustable connection permitting adjustment of said blade head on said spindle.

17. The foot cutting apparatus as defined in claim 5 in which the cutting edges of said second cutting blades terminate radially inwardly of said base cutting blade at points spaced from the intersection of said first cutting blades.

18. The food cutting apparatus as defined in claim 5 in which the cutting edges of said second cutting blades terminate radially inwardly of said base cutting blade and at points spaced from the intersection of said first cutting blades, the points of termination of the cutting edges of adjacent ones of said second cutting blades being spaced different distances from the intersection of said first cutting blades.

19. Food cutting apparatus comprising, in combination, support means, a blade head including a ring shaped continuous base cutting blade with a multiplicity of long and short cutting blades intersecting same, two of said blades being centrally notched for interengagement with each other with their cutting edges in a common plane, and the other blades extending radially outward from said notched portion of said first mentioned blades and with their cutting edges in the same plane as the cutting edges of said first two blades, a carrying means for all of said cutting blades, means for releasably anchoring said cutting blades to said carrying means portion of said blade head, means mounting said blade head on said support means for reciprocable movement relative thereto, means for reciprocating said blade head into cutting position and then back into starting position, a cutting board secured to said support means beneath said blade head, platter means for an article of food to be cut and including an arcuate peripheral portion, means on said platter means for locating an article to be cut substantially centrally thereof, and a pair of locating pins on said cutting board for engagement with said arcuate peripheral portion of said platter means upon insertion of the latter on said cutting board beneath said blade head, said locating pins being in predetermined spaced relationship relative to the respective centers of said blade head and platter means to substantially center the latter beneath said blade head.

References Cited in the file of this patent

UNITED STATES PATENTS

| | | |
|---|---|---|
| 1,175,512 | Flemal | Mar. 14, 1916 |
| 1,271,218 | Powell | July 2, 1918 |
| 1,453,367 | Schipplock et al. | May 1, 1923 |
| 1,467,395 | Ross et al. | Sept. 11, 1923 |
| 1,656,415 | Breitkrentz | Jan. 17, 1928 |
| 2,302,323 | Hubbard | Nov. 17, 1942 |
| 2,625,972 | Torres | Jan. 20, 1953 |
| 3,016,608 | Myers | Jan. 16, 1962 |
| 3,060,838 | Priore | Oct. 30, 1962 |

UNITED STATES PATENT OFFICE
CERTIFICATE OF CORRECTION

Patent No. 3,132,423

May 12, 1964

Artus D. De Lano

It is hereby certified that error appears in the above numbered patent requiring correction and that the said Letters Patent should read as corrected below.

Column 6, line 19, for "in" read -- is --; line 46, for "joint" read -- point --; column 10, line 18, for "foot" read -- food --.

Signed and sealed this 29th day of September 1964.

(SEAL)
Attest:

ERNEST W. SWIDER
Attesting Officer

EDWARD J. BRENNER
Commissioner of Patents